(12) United States Patent
Gaddamanugu et al.

(10) Patent No.: US 7,447,749 B2
(45) Date of Patent: Nov. 4, 2008

(54) METHOD AND APPARATUS FOR WEB-BASED INTERNATIONAL FACILITY PLANNING

(75) Inventors: Bala Surya Siva Sri Gaddamanugu, Cumming, GA (US); Jagannath Harati, Alpharetta, GA (US); Jacquenetta M. Mason, Duluth, GA (US); Vitaly Smirnoff, Alpharetta, GA (US); Harold Jeffrey Stewart, Alpharetta, GA (US)

(73) Assignee: AT&T Corp., New York, NY (US)

( * ) Notice: Subject to any disclaimer, the term of this patent is extended or adjusted under 35 U.S.C. 154(b) by 873 days.

(21) Appl. No.: 10/746,041

(22) Filed: Dec. 23, 2003

(65) Prior Publication Data
US 2004/0221028 A1 Nov. 4, 2004

Related U.S. Application Data

(60) Provisional application No. 60/466,706, filed on Apr. 30, 2003.

(51) Int. Cl.
*G06F 13/00* (2006.01)
(52) U.S. Cl. ............... 709/219; 709/224; 719/328
(58) Field of Classification Search ............. 709/217, 709/219, 220, 223, 224; 719/328, 329
See application file for complete search history.

(56) References Cited

U.S. PATENT DOCUMENTS

| | | | | |
|---|---|---|---|---|
| 5,500,934 A | * | 3/1996 | Austin et al. | 715/853 |
| 5,987,513 A | * | 11/1999 | Prithviraj et al. | 709/223 |
| 6,054,987 A | * | 4/2000 | Richardson | 715/734 |
| 6,343,290 B1 | | 1/2002 | Cossins et al. | |
| 6,477,572 B1 | * | 11/2002 | Elderton et al. | 709/224 |
| 6,765,591 B2 | * | 7/2004 | Poisson et al. | 715/735 |
| 7,075,536 B1 | * | 7/2006 | Goldschmidt | 345/440 |
| 7,139,819 B1 | * | 11/2006 | Luo et al. | 709/223 |
| 7,154,857 B1 | * | 12/2006 | Joiner et al. | 370/245 |
| 2003/0041238 A1 | * | 2/2003 | French et al. | 713/153 |

OTHER PUBLICATIONS

Examiner's Report for Canadian Patent Application No. 2,465,574, copy consists of 2 pages.

* cited by examiner

*Primary Examiner*—Viet Vu

(57) ABSTRACT

A method and tool for managing network infrastructure is presented. The tool provides information related to infrastructure of international networks, including facilities and equipment, and enables the display of such information. The information can be displayed in both geographic and tabular form. The equipment includes international as well as proprietary equipment, and information describes the relationship between the two.

13 Claims, 20 Drawing Sheets

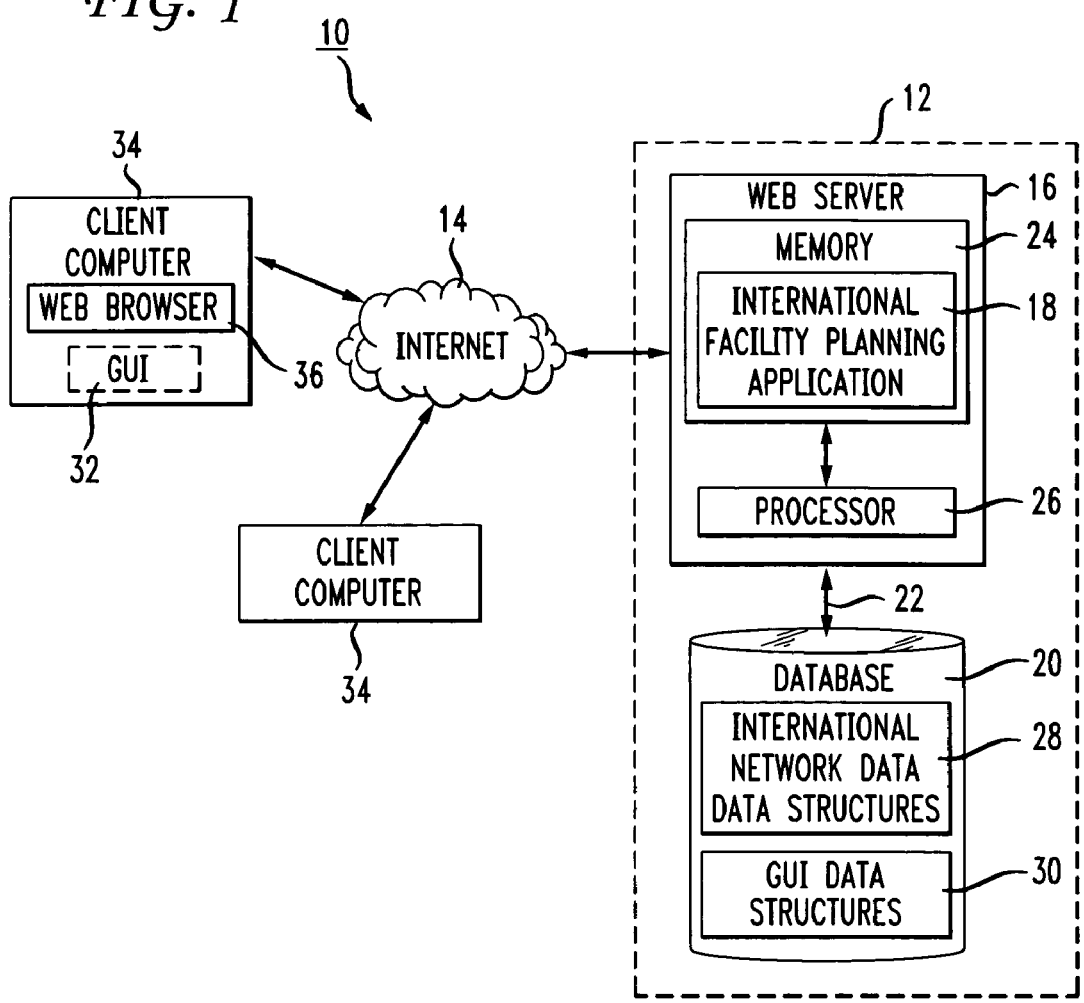

All Devices

Device data

| ✓ Device Host name | Location | Device type | IP Address | Country | Region Site owner | In production |
|---|---|---|---|---|---|---|
| TRTHISD1504 | Haifa | RPM | NOIP | Israel | Med 1 | NO |
| RJNRBRD1P04 | Rie De Janiero | RPM | NOIP | Brazil | Impsat Telecom | NO |
| LSBNPTD1P11-0214 | Lisbon | RPM | 165,87,254,93 | Portugal | Carrierhouse | YES |
| LSBNPTD1504 | Lisbon | RPM | NOIP | Portugal | Carrierhouse | YES |
| AMSTNLD1 | Amsterdam | MGX-45 | 32,95,238,21 | Netherlands | Global Switch | YES |
| AMSTNLE1 | Amsterdam | MGX-1 | 32,95,238,76 | Netherlands | Global Switch | YES |
| AMTRNLD1P03-0053 | Amsterdam | RPM | 165,87,254,44 | Netherlands | Global Switch | YES |
| AMTRNLD1P11-0055 | Amsterdam | RPM | NOIP | Netherlands | Global Switch | YES |
| AMTRNLD1504-0054 | Amsterdam | RPM | 165,87,255,16 | Netherlands | Global Switch | YES |
| ARBNAR2001HU3 | Buenos Aires 2 | 3512 | 165,87,244,10 | Argentina | IBM | NO |
| ARBNAR20001NM1 | Buenos Aires 2 | 2621 | NOIP | Argentina | IBM | NO |
| ARBUNA1 | Buenos Aires 1 | 2621 | NOIP | Argentina | AT&T Latin America | NO |
| ARBUNA1 | Buenos Aires 1 | 3512 | NOIP | Argentina | AT&T Latin America | NO |
| ARBUNA1 | Buenos Aires 1 | RPM | NOIP | Argentina | AT&T Latin America | NO |
| ARBUNA1 | Buenos Aires 1 | RPM | NOIP | Argentina | AT&T Latin America | NO |
| ARBUNA1 | Buenos Aires 1 | RPM | NOIP | Argentina | AT&T Latin America | NO |
| ARBUNA1 | Buenos Aires 1 | MGX-45 | NOIP | Argentina | AT&T Latin America | NO |
| ARBUNA1 | Buenos Aires 1 | MGX-1 | NOIP | Argentina | AT&T Latin America | NO |
| ARBUNA2 | Buenos Aires 2 | RPM | NOIP | Argentina | IBM | NO |
| ARNHNLE1 | Arnhem | MGX-1 | NOIP | Netherlands | Versatel | NO |
| ARNHGRD1 | Athens | MGX-45 | 32,95,238,251 | Greece | Med Nautilus | YES |
| ATHNGRD1P03-0169 | Athens | RPM | 165,87,254,85 | Greece | Med Nautilus | YES |
| ATHNGRD1P11-0170 | Athens | RPM | 165,87,254,85 | Greece | Med Nautilus | YES |
| ATHNGRD1504- | Athens | RPM | NOIP | Greece | Med Nautilus | NO |
| ATHNGRE1 | Athens | MGX-1 | 32,95,238,123 | Greece | Med Nautilus | YES |
| ATKLFT1 | Klagenfurt | RPM | NOIP | Austria | Kelag | NO |

Done    Local Intranet

FIG. 21

AT&T — Device data

Edit File View Favorites Tools Help

| Device | Location Information | ✓ Site Details | Power Supply | Security |

| | |
|---|---|
| Tele Housing Site Owner | Raco |
| TH Site Contact Name | Randy Douglas |
| Day Tel No. | +1 416 269 1161 |
| TH 24/7 Tel No. | +1 416 685 7443 |
| TH Site Address | Raco, 151 front Street West, Suite 300, Toronto, Ontario M5J 2N1 |
| Machine Room | AT&T Cage, 3rd floor, Suite 300 |
| Site Line Tech1 Name | Felix Sherman |
| EMail ID | felix.sherman@racagroup.net |
| Tel No. | +1 416 369 1161 |
| Site Line Tech Name | Corinne Knapman |
| EMail ID | knapman@att.com |
| Tel No. | +1 905 762 7421 |
| Country | Canada |

FIG. 2M

PrismObjectProperty

🖨 Print  📄 Export to Excel

Object properties

Data for facility: [A] OC3U SNFCCA01H91 SNFCCADDN57

| | |
|---|---|
| Name | 481_OC3U____SNFCCADDN57SNFCCA01H91 |
| Service code | OC3U |
| Service description | OC3 |
| Container | |
| Circuit ID | 03/GPVZ/002506//TPM/ |
| Ring | 03-R4801/3UPSR |
| Bandwidth | ST53 |
| Building A | 555 PINE ST |
| Location A | SNFCCA01H91 (AP) |
| Start complex | SNFCCA01H91-DDM2000_OC312R_TPL-0201001 |
| Start complex type | DDM2000_OC312_TPL |
| Start slot | SNFCCA01H91-DDM2000_OC312R_TPL-0201001-M2-1 |
| Start plugin | |
| Start port | T |
| Start FIC | |
| Building Z | 425 MARKET ST |
| Location Z | SNFCCADDN57(F) |
| End complex | SNFCCADDN57-DDM2000_OC312R_TPL-0101001 |
| End complex type | DDM2000_OC312R_TPL |
| End slot | SNFCCADDN57-DDM200_OC312R_TPL-0101001-M1-1 |
| End plugin | |
| End port | T |
| End FIC | |
| Status | E(Active) |
| Status date | 7/11/2003 12:00:00 AM |
| Service date | |
| Customer | ATTS01 |
| Project | SANP0203112 |
| Frame format | N/A |
| Line format | N/A |

Done  Local Intranet

FIG. 2N

PrismObjectProperty — 220

🖨 Print  📋 Export to Excel

| Object properties | |
|---|---|
| Data for location SNFCCA01H91 | |
| CLLI | SNFCCA01H91 |
| Building | 555 PINE ST |
| Floor ID | 011 |
| Location type | AP |
| Location name | AT&T CORE/POP loc that can serve customers |
| Contact | |
| Contact phone | |
| Customer | AT&T/TCSF(SAN) |
| Customer ID | 11579 |
| Community | SAN FRANCISCO |
| County | SAN FRANCISCO |
| State | CA |
| Zip code | 941080000 |
| Country | USA |
| Latitude | 374730,439 |
| Longitude | 1222414,16 |
| V | 8491,5598 |
| H | 8718,6105 |

222 → CLLI
224 → Building
226 → Floor ID

Done   Local Intranet

FIG. 2P

PrismObjectProperty

🖨 Print   📑 Export to Excel

Object properties

Data on project: SANP0203112

| | |
|---|---|
| Circuit ID | 03/GPVZ/002506//TPM/ |
| Common Carrier | ATX |
| Cust PO Number | GWSA2128549 |
| Cust PO version | AA |
| Project | |
| Access Cust terminal | SNFCCA01H91 |
| Addititional termainal | SNFCCA01F09 |
| Billing Account Number | ATTS01 |
| Subscriber Auth Number | ATTS01 |
| Customer Circuit ID | /ACEC/810548//ATI/ |
| Record status | A |
| Date Sent | 4/10/2002 9:13:00 AM |
| Sent to Eng Date | |
| Received Date | 4/10/2002 11:32:00 AM |
| Desired Due Date | 4/30/2002 12:00:00 AM |
| Turnup Date | 6/5/2002 12:00:00 PM |
| Update Date | 6/5/2002 12:00:00 AM |
| Disconnect Date | |

Done     Local Intranet

PrismObjectProperty

🖨 Print  📄 Export to Excel

| Object properties |
|---|
| All facilities in building: SNFCCA01 |
| 📄Facility data 📄Carries fclty 📄Fclty carries 📄Customer circuits  🔍Ring view 📄Span info 📄Project data |

| Serial | Status | Type | CLLIA | CLLIZ | Application |
|---|---|---|---|---|---|
| 2502 | A | T3 | SNCCA01W44 | SNFFCADKK01 | LSO |
| 4003 | A | T11XC | SNFCCACHN06 | SNFCCA01N22 | CST |
| 7 | A | T1XC | SNFCCA01W60 | SNFFCADKDS2 | CKT |
| 3011 | A | ST01XM | SNFCCAFJK05 | SNFCCA01H91 | BCK |
| 2505 | A | T3 | OKLDCA03K81 | SNFCCA01W44 | LSO |
| 2503 | A | T3 | OKLDCA03K81 | SNFCCA01W44 | LSO |
| 2507 | A | T3 | OKLDCA03K81 | SNFCCA01W44 | LSO |
| 2503 | A | T3 | OKLDCAUNK03 | SNFCCA01W44 | LSO |
| 2515 | A | T3 | SNFCCAFJK05 | SNFCCA01W44 | LSO |
| 7 | A | T1XC | SNFCCA01W44 | SNFCCAFJD50 | CKT |
| 11 | A | T1XC | SNFCCA01W60 | SNFFCADKD50 | CKT |
| 9 | A | T1XC | SNFCCA01W60 | SNFFCADKD50 | CKT |
| 2501 | A | ST01XM | SNFCCA01H86 | SNFCCAFJK04 | LSO |
| 2901 | A | ST01 | SNFCCA01H86 | SNFCCAFJK04 | IXC |
| 4001 | A | T3XF | SNFCCA01W60 | SNFCCACIN05 | CST |
| 2506 | A | T3 | OKLDCA03K81 | SNFCCA01W44 | LSO |
| 2501 | A | T3 | SNFCCA01W44 | SNFFCADKK01 | LSO |
| 4004 | A | T1XC | SNFCCACHN06 | SNFCCA01N22 | CST |
| 8 | A | T1XC | SNFCCA01W60 | SNFFCADKD52 | CST |
| 4001 | A | T1 | SNFCCAFJK03 | SNFCCA01N22 | CST |
| 5 | A | T1XC | SNFCCA01W60 | SNFFCADKD50 | LSO |
| 2 | A | T1XC | SNFCCA01W60 | SNFFCADKD52 | IXC |
| 4005 | A | T1XC | SNFCCACHN06 | SNFCCA01N22 | CST |
| 2901 | A | T1XC | SNFCCA01W60 | OKLDCA03D56 | IXC |

Done　　　　　　　　　　　　　　　　　Local Intranet

FIG. 2S

PrismObjectProperty

🖨 Print  📋 Export to Excel  🌐 Edit ― 286

Object properties

All circuits in building: SNFCCA01

284 ― 📄 ckt data  ⇄ carries sktfclty  ⚡ span info  🗂 project data

| Serial | Status | Type | CLLIA | CLLIZ | Application |
|---|---|---|---|---|---|
| 03-CFZZ-000256TCG | A |  | SNFCCACIN05 | SNFCCA01H91 | CKT |
| 03/CSZZ/0093396//TFR/ | A |  | SNFCCA01W60 | SNFCCA21W73 | CKT |
| 03-ATTZ-800444 | A | T11XC | SNFCCA01D50 | SNFCCAFJD50 | CKT |
| 03-ASZZ-002125 | A | T11XC | SNFCCA01H86 | SNFCCAFJD50 | CKT |
| 03/ATZZ/007406//TCG/ | A |  | SNFCCACDN22 | SNFCCA01W60 | CKT |
| 03-ASTZ-000918 | A |  | SNJSCAENH02 | SNFCCA01H91 | CKT |
| 03/ATZZ/008227//TCG/ | A |  | SNFCCA01W60 | SNFCCAWTN07 | CKT |
| 03/ATZZ/008232//TCG/ | A |  | SNFCCA01W60 | SNFCCAWTN07 | CKT |
| 03/ATZZ/008224//TCG/ | A | T11XC | SNFCCA01W60 | SNFCCAFJD50 | CKT |
| 03/ATZZ/006944//TCG/-A | A |  | SNFCCA01W60 | SNFCCAEJN11 | CKT |
| 2153/T1XC/SNFCCAFJDS0/SNFCCA01W60 | A | T11XC | SNFCCA01W60 | SNFCCAFJD50 | IXC |
| 03/ATTZ-015093 | A | T11XC | SNFCCA01D52 | SNFCCAFJD50 | CKT |
| 2169/T1XC/SNFCCAFJDS0/SNFCCA01W60 | A | T11XC | SNFCCA01W60 | SNFCCAFJD50 | IXC |
| 2170/T1XC/SNFXXAFJDS0/SNFCCA01W60 | A | T11XC | SNFCCA01W60 | SNFCCAFJD50 | IXC |
| _TXXU_4153982293__ | A |  | SNFCCA01H86 | SNFCCA01W30 | CKT |
| _TXXU_4153982293__ | A |  | SNFCCA01H86 | SNFCCA01W30 | CKT |
| _TXXU_4154214001__ | A |  | SNFCCA01H86 | SNFCCA01W30 | CKT |
| _TXXU_4154214001__ | A |  | SNFCCA01H86 | SNFCCA01W30 | CKT |

📄 Done    Local Intranet

METHOD AND APPARATUS FOR WEB-BASED INTERNATIONAL FACILITY PLANNING

CROSS REFERENCE TO RELATED APPLICATIONS

This application claims priority from U.S. Provisional Patent Application No. 60/466,706, filed Apr. 30, 2003, which is incorporated herein by reference in its entirety for all purposes.

BACKGROUND

The invention relates generally to network facility planning.

As a network provider's facilities for providing networks of optical, radio, satellite and other types of communications grow and expand beyond boundaries of a particular country, it becomes increasingly important for that network provider to manage and track the use of international facilities belonging to the network provider as well as third party entities. Those facilities may connect locations in different countries, and are often situated on different continents. A network provider may use such international facilities to design, implement and maintain its network and provide services to interested customers. These tasks require an extensive amount of work by facility planners, facility engineers, technicians and other specialists.

In addition, many companies that provide services through their networks have to use facilities belonging to international networks in order to expand their businesses outside the country. To make effective use of international facilities, such companies need to provide a way for their personnel to work with network infrastructures, to plan and implement new facilities riding on existing international facilities, and to maintain implemented units.

SUMMARY

A method and corresponding apparatus for managing network infrastructure is provided. The method includes providing information related to infrastructure of international networks, including facilities and equipment, and enabling the information to be displayed to a user.

International facility planning tasks require an extensive amount of work by facility planners, facility engineers, technicians and other personnel. The mechanism of the present invention thus enables those specialists to perform their job in more effective way. It also makes vital technical information about a network of international facilities as accessible as possible to those who need it.

DESCRIPTION OF DRAWINGS

FIG. 1 shows a block diagram of a networked system environment in which a Web-based international facilities planning application is employed.

DETAILED DESCRIPTION

Figure 2A:
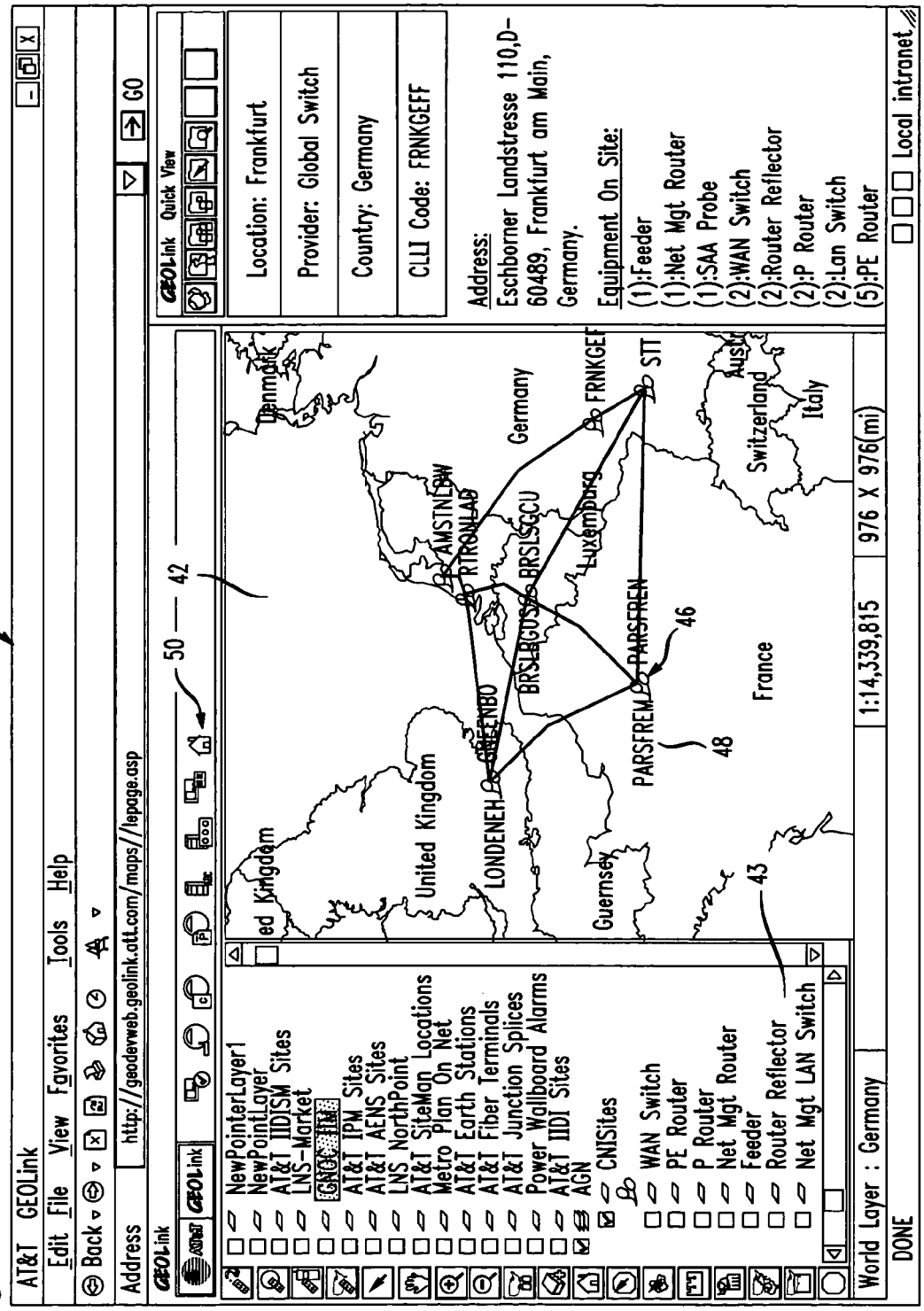
FIGS. 2A-2S show various graphical user interface screen shots illustrating functionality of the Web-based international facilities planning application.

Referring to FIG. 1, a networked system environment 10 includes a system 12 connected to a network 14. In one embodiment, as illustrated, the network 14 is the Internet and the system 12 is implemented as a Web-based architecture. The system 12 includes a Web server 16, which is configured with a Web-based application 18, and a database 20 that is coupled to the Web server 16 by a data link or bus 22. The Web-based application 18, which is stored in an internal memory 24 and executed by a processor 26, allows access to the database 20 for information about international facilities and how those facilities are being used by a company's own facilities. The database 20 includes data structures that store international network data 28, and is the main source and storage for the international network data. The network data structures (or network data records) 28 provide data for international and proprietary network infrastructure, as well as data representing the relationship between the two. The database 20 further includes graphical user interface (GUI) data structures 30 that store information usable to produce a GUI 32.

Also coupled to the Internet 14 are one or more client computers 34 which are operated by users of the application 18, e.g., international facility planners and other users. The application 18 provides the GUI 32 to the user of the client computer 34, via a client device, for example, a Web-browser 36, as shown. The GUI 32 is an intuitive interface that provides the user with a representation of an international network. The representation may take a geographical or tabular form, as will be described later. The system 12 thus allows a user to access in a fast and reliable manner data concerning international facilities from the database 20 and to display that data in an appropriate form. The GUI data structures 30 and network data records 28 can be modified or updated as well.

FIGS. 2A-2S show various screen shots of an exemplary GUI 36 generated by the application 18 using the GUI data structures 30. These screen shots will be used to illustrate different features and capabilities of the application and GUI.

Referring to FIG. 2A, the main screen of the application, a geographic view 40, is shown. The geographic view 40 includes a map of the world 42, with a selection of objects representing facilities, equipment and other-entities (selected via a tree structure 43) being linked geographically to points on the map. That is, each object is displayed on the map accord to the geographical coordinates of the device (or other entity) it represents. Each object displayed on the map is represented by a symbol 46 and a short text label 48. The label 48 conveys certain attributes of the object. The label can be changed to display different attributes of the object. For example, an object label can be selected to display any one of the following attributes: Point-of-Presence (POP) codes, Host name, IP address and device type. In the illustrated embodiment, the types of devices that are supported by the application are the following: Feeder; Network management router; SAA probe; WAN switch; Route reflector; "P" router; LAN switch; and "PE" router.

The greographic view 40 displays objects of each type on different graphical layers. Each graphical layer can be independently selected (that is, switched on and off), thus allowing customization of the geographical view 42 according to user preferences. Also, objects of different types may be represented by different symbols of different colors to facilitate distinction between them.

The main screen also includes a toolbar 50, which a user can use to access other pages of the GUI, or modify the geographic view 40. Starting at the left side of toolbar 50, a first toolbar button, button 52, can be used to access a list of all the devices available in database (as will be described later with reference to FIG. 2F). The next five buttons on the toolbar 50, button 54, button 56, button 58, button 60 and button 62, allow a user to change the type of information displayed as labels on the map 42. The next button to the right, button 64, can be used to view information on selected objects. A user selects an object on the map by clicking the symbol representing the object. For example, a user might click on a line representing a fiber, or on a "pin" symbol representing a device. This action takes the user to a tabular data form, examples of which will be described later.

As mentioned above, there are five buttons in the toolbar on the main geographic view screen, label mode toolbar buttons 54, 56, 58, 60, 62, can be used to change the type of information displayed as object labels. The available options include: i) site country in which a device is situated (selected via toolbar button 54); ii) Common Language Location Identifier (CLLI) code of the device (selected via toolbar button 56); iii) POP code of the device (selected via toolbar button 58); iv) host name of the device's host (selected via toolbar button 60); and v) IP address of the device's host (selected via toolbar button 62).

Figure 2B:
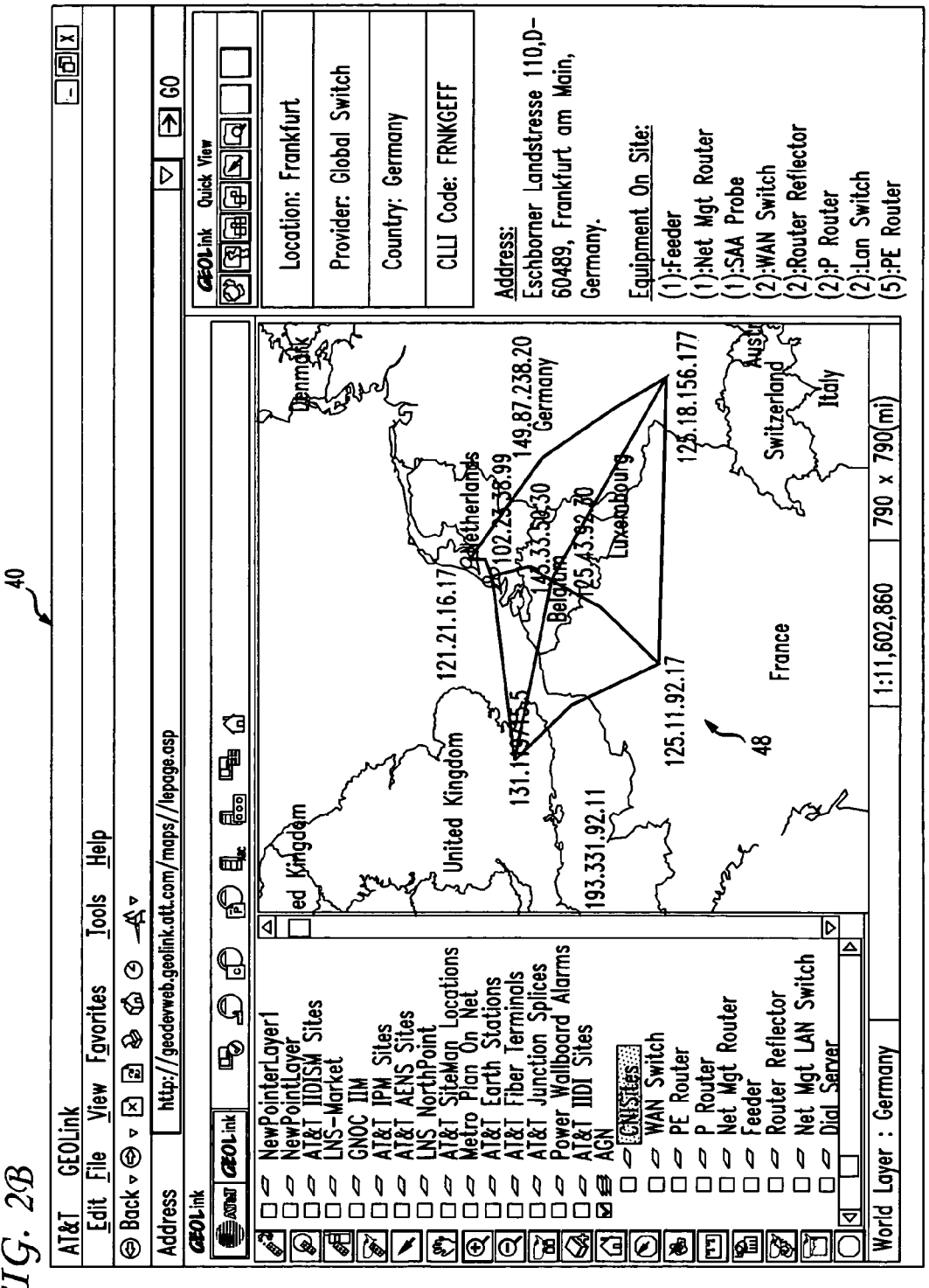
Figure 2C:
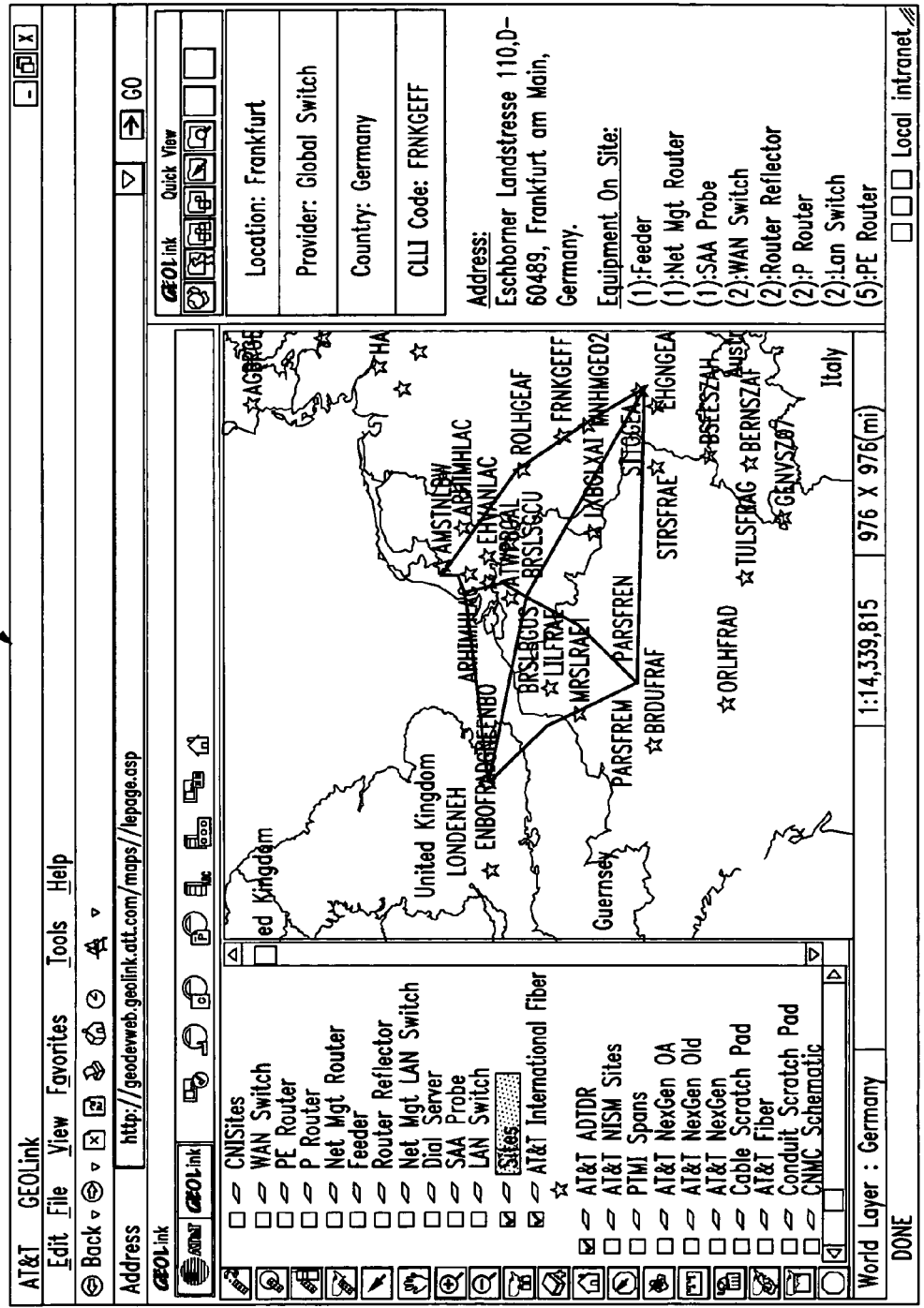

FIG. 2B shows how the geographic view changes when a user clicks on the button 62 to set the labels to indicate IP addresses. The example screenshot shows the same world map view (showing a part of the Europe market) as shown in FIG. 2A, but with IP addresses of the device hosts shown as the object labels 48. Referring to FIG. 2C, if a user clicks on the button 56 corresponding to "CLLI codes", the displayed object labels change from IP addresses (or whichever label was previously displayed) to CLLI codes.

The tree structure 43 of the geographic view 40 allows a user to select different graphical (or display) layers. Since different types of objects are placed on different layers, the user is able to customize the display to meet his or her needs, for example, to show devices of only certain type or types.

Figure 2D:
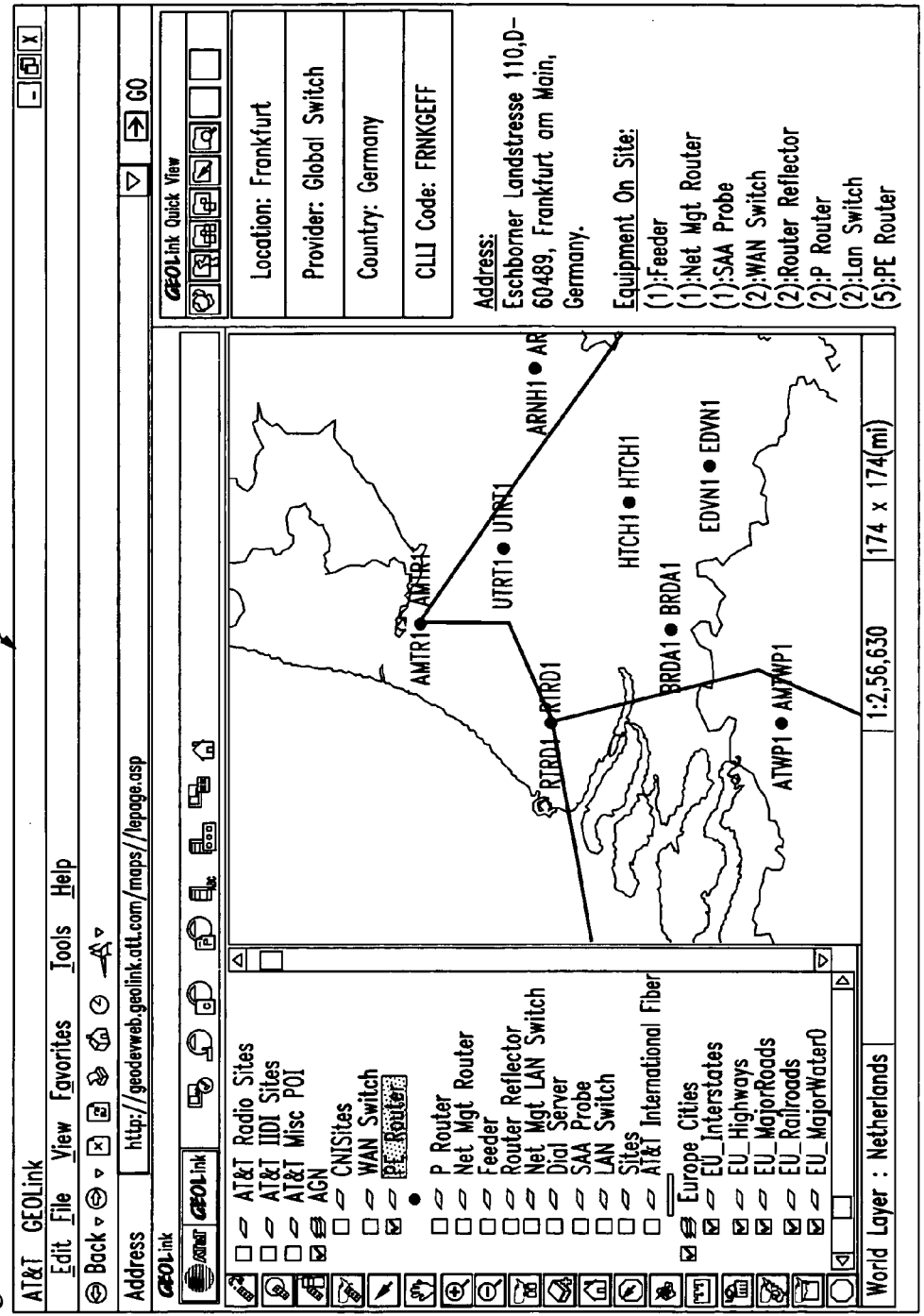
Figure 2E:
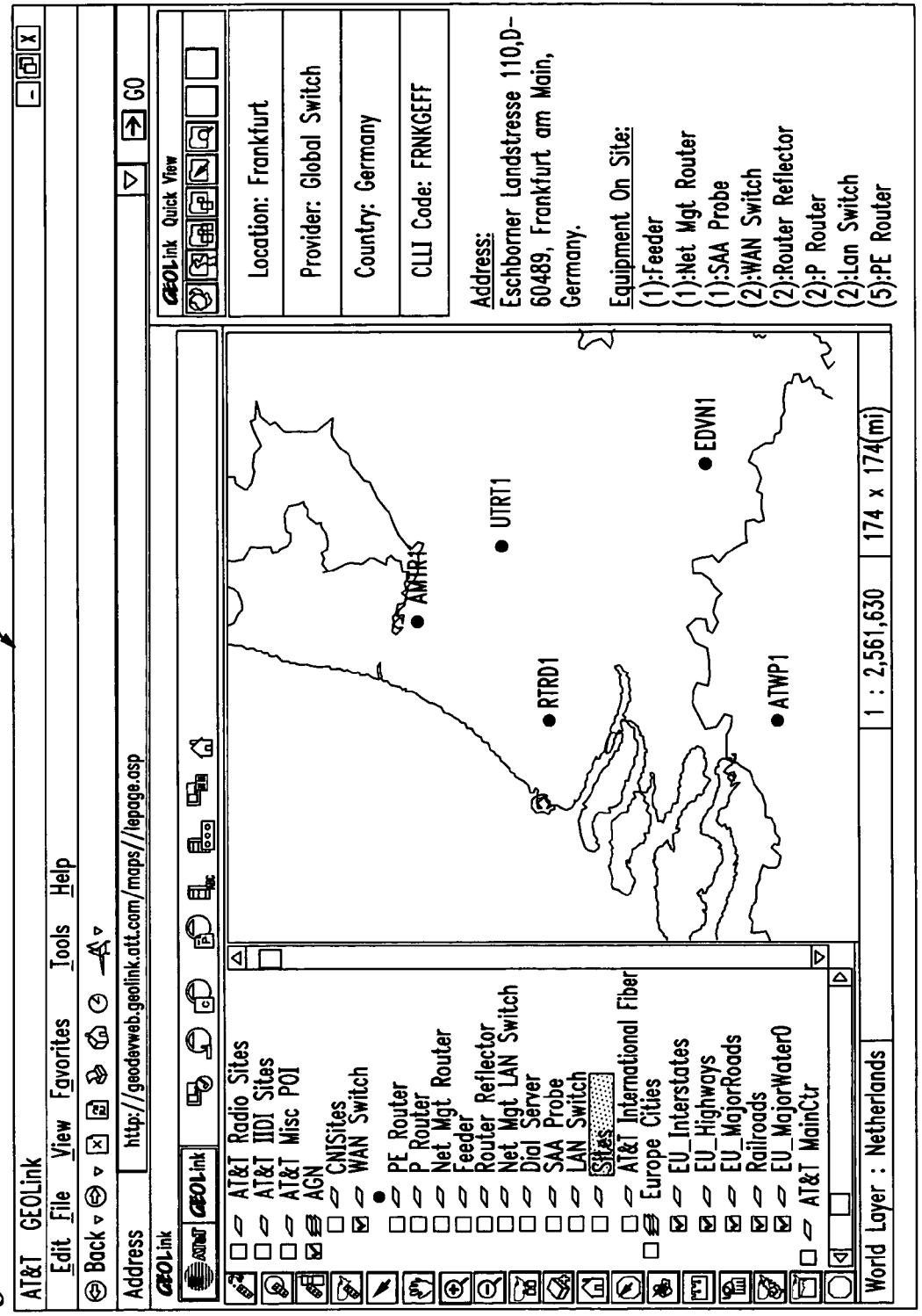

Some screenshot illustrations of this display layer selection are shown in FIGS. 2D-2E. The screenshots in both figures show a map depicting the same part of the Europe market. Referring first to FIG. 2D, it can be observed that only two layers are displayed on the screen. One of those layers contains "AT&T International Fiber" and the other layer contains "PE routers". It may be noted that these items are selected in corresponding check boxes to the left of these items in the tree structure 43. A third selected check box represents the application using the set of layer to which the selected layers belong (since multiple applications can share the same geographic view).

If a user "switches off" both of the "PE Router" and "AT&T International Fiber" layers and switches on the "WAN Switch" layer, the resulting geographic view is as shown in FIG. 2E. Again, note the user's selection of the displayed layer, "WAN Switch" (as well as the application "AGN") in the tree structure 43. In this view, the user only sees symbols that represent WAN switches on the map. This mechanism of working with layers of the map allows a user to avoid cumbersome and heavy display, thus allowing the user to concentrate on the information of interest to that user.

The Web-based application 18 enables display of data for international equipment in tabular as well as mapped form. There are several ways of obtaining data in tabular form in the application. All of these ways involve the use of one or more buttons on the geographical view toolbar.

One way to obtain a data display in tabular form is by using the first toolbar button, button 52. Referring to FIGS. 2A and 2F, clicking on the button 52 in the geographic view causes generation of a device listing 60. The device listing 60 includes rows 62 corresponding to devices and columns corresponding to different types of information about the device, e.g., as shown in FIG. 2F, a "Host name" column 64, a "Location" column 66, a "Device type column 68, an "IP address" column 70, a "Country" column 72, a "Region" column 74, a "Site owner" column 76 and an "In production" column 78. Each of rows in this result represents a device and can be selected. Once a device is selected, a new toolbar option (shown as "Device data") 80 appears at the top of the list. The toolbar option allows the user to obtain detailed data on the selected device.

Alternatively, a user can click on button 64 to view information on a selected device or selected equipment. A user selects equipment on the map by clicking the symbol representing the equipment. The application returns the detailed data for the selected equipment. By clicking on virtually any entity in the window, information on this object can be obtained in a separated window.

Figure 2G:
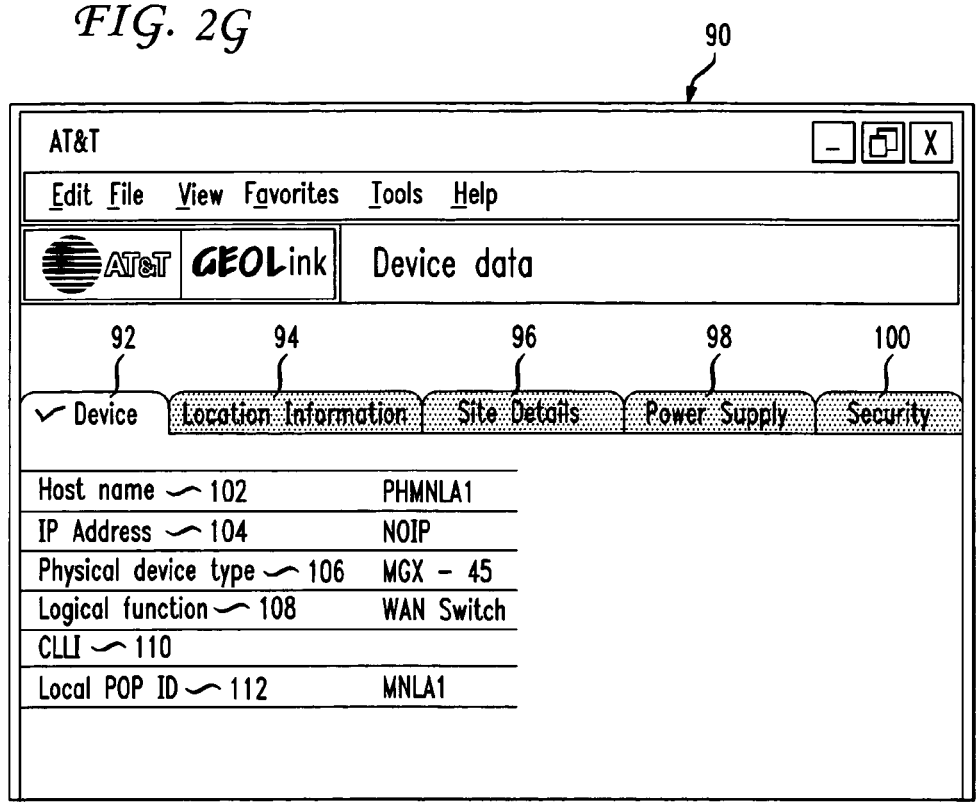
Figure 2H:
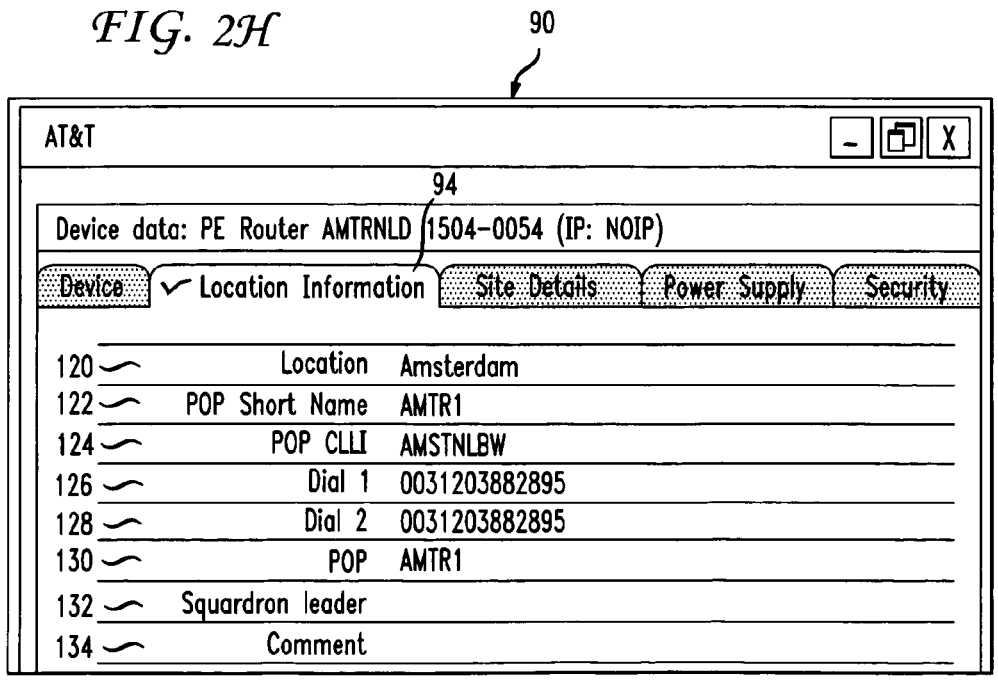
Figure 2J:
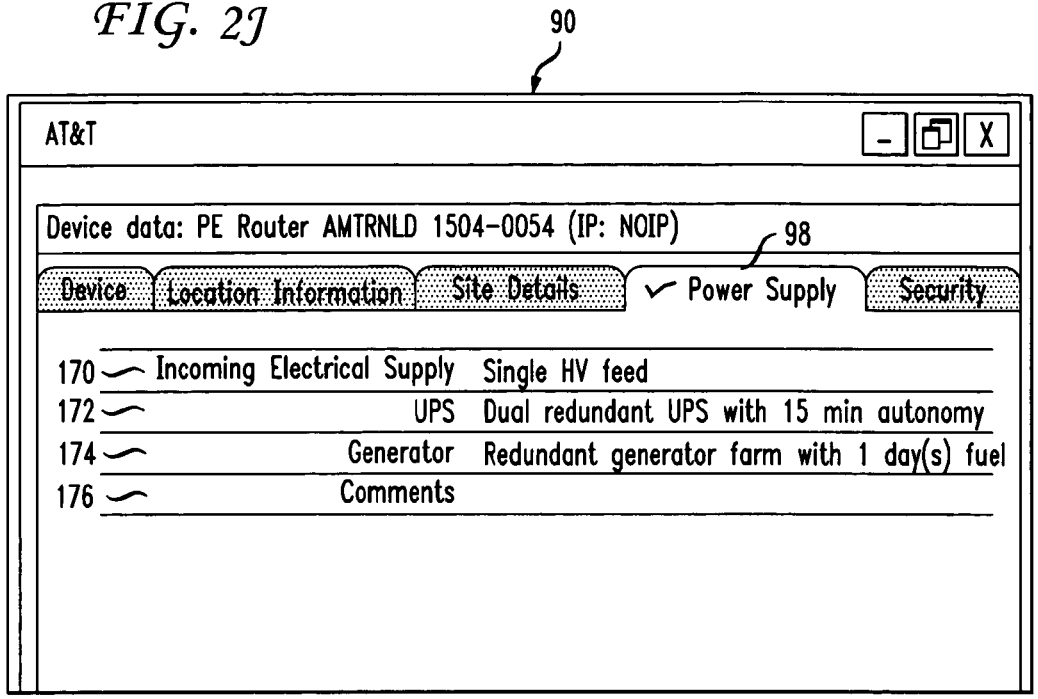
Figure 2K:
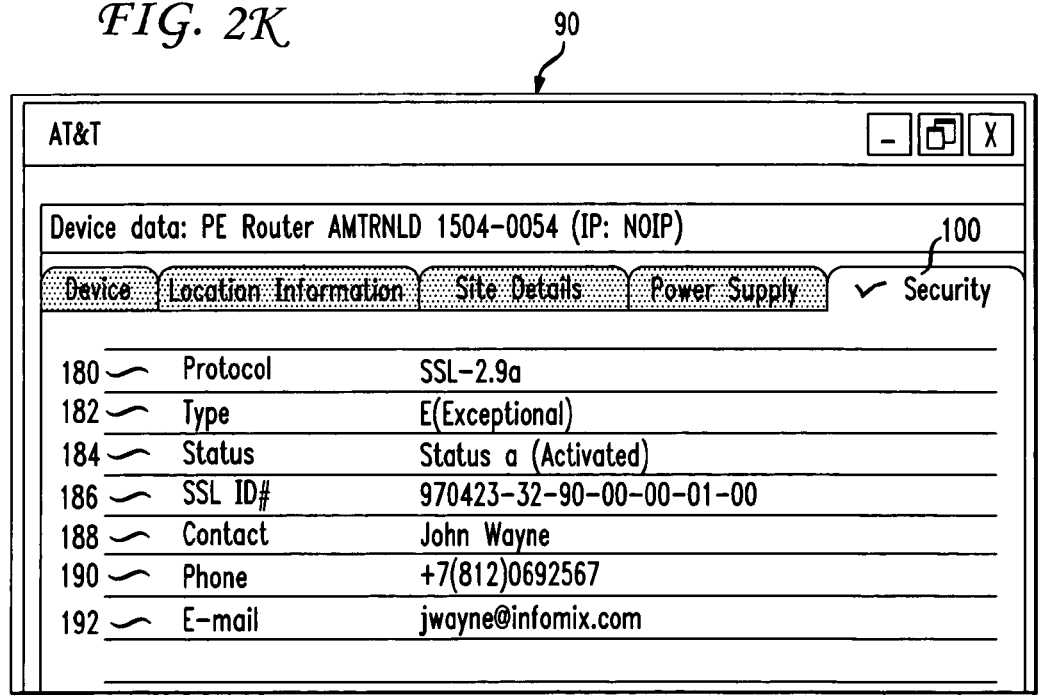

FIGS. 2G-2L show screenshots of a screen for device data 90 (resulting from one of the device selection actions described above), for example, clicking on button 52. Referring to FIG. 2G, the device data screen includes a number of tabs. The tabs include a "Devices" tab 92, a "Location Information" tab 94, a "Site Details" tab 96, a "Power Supply" tab 98 and a "Security" tab 100. In FIG. 2G, a selection of the Devices tab 92 is shown. The selection of this tab provides the user with various device data, including: Host name 102; IP address 104; Physical device type 106; Logical function 108; CLLI 110 and Logical POP ID 112. FIG. 2H shows the selection of the Location Information tab 94. The selection of Location Information tab 94 provides the user with the following location information fields: location 120; POP short name 122; POP CLLI 124; Dial 1 126; Dial 2 128; POP 130; Squadron Leader 132 and a comments field 134. The site details tab selection is shown in FIG. 2I. This tab selection provides information such as the site owner and site owner contact information. The power supply tab selection, shown in FIG. 2J, provides such information as "incoming electrical supply" 170, UPS 172, generators 174 and any related comments 176. The security tab selection, shown in FIG. 2K, provides the following information fields: protocol 180; type 182; status 184; SSL ID number 186; contact 188; as well as phone and email for the contact indicated in contact field 188, fields 190 and 192, respectively.

Figure 2L:
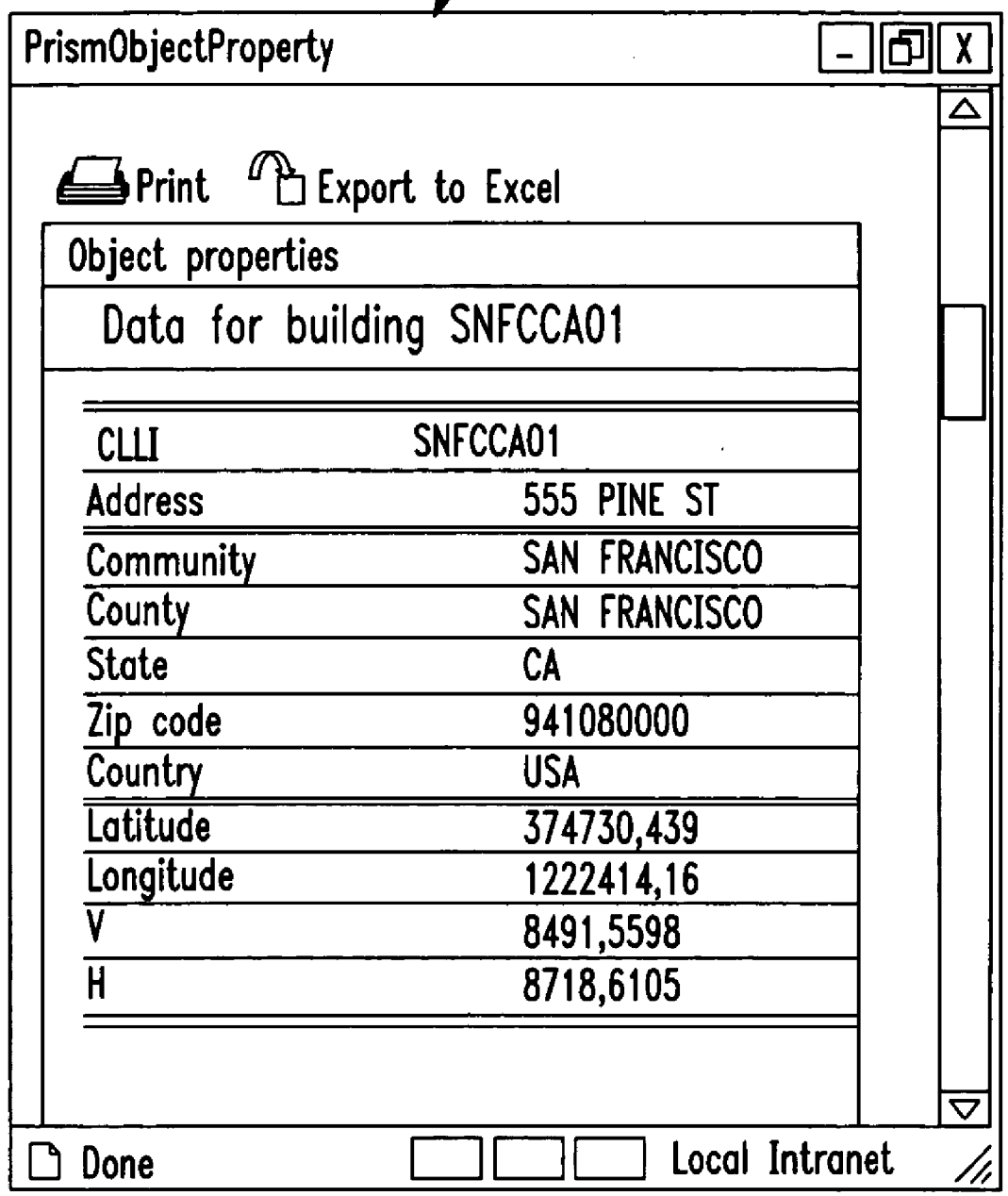
Figure 20:
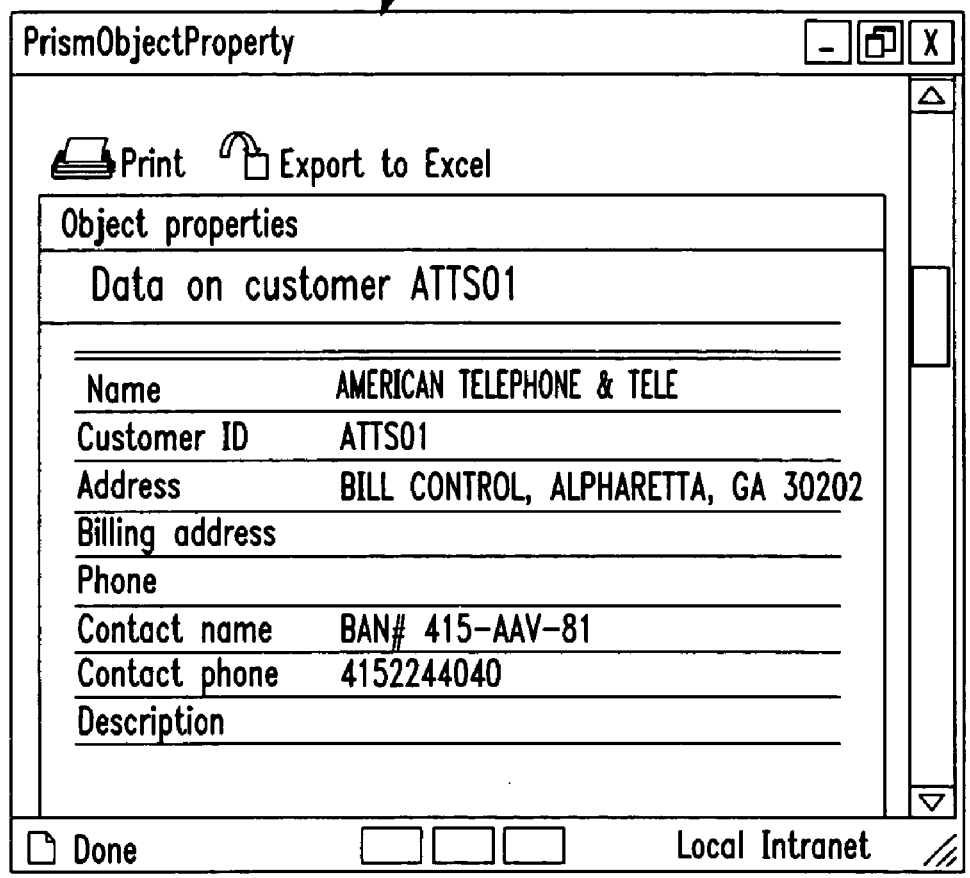
Figure 2Q:
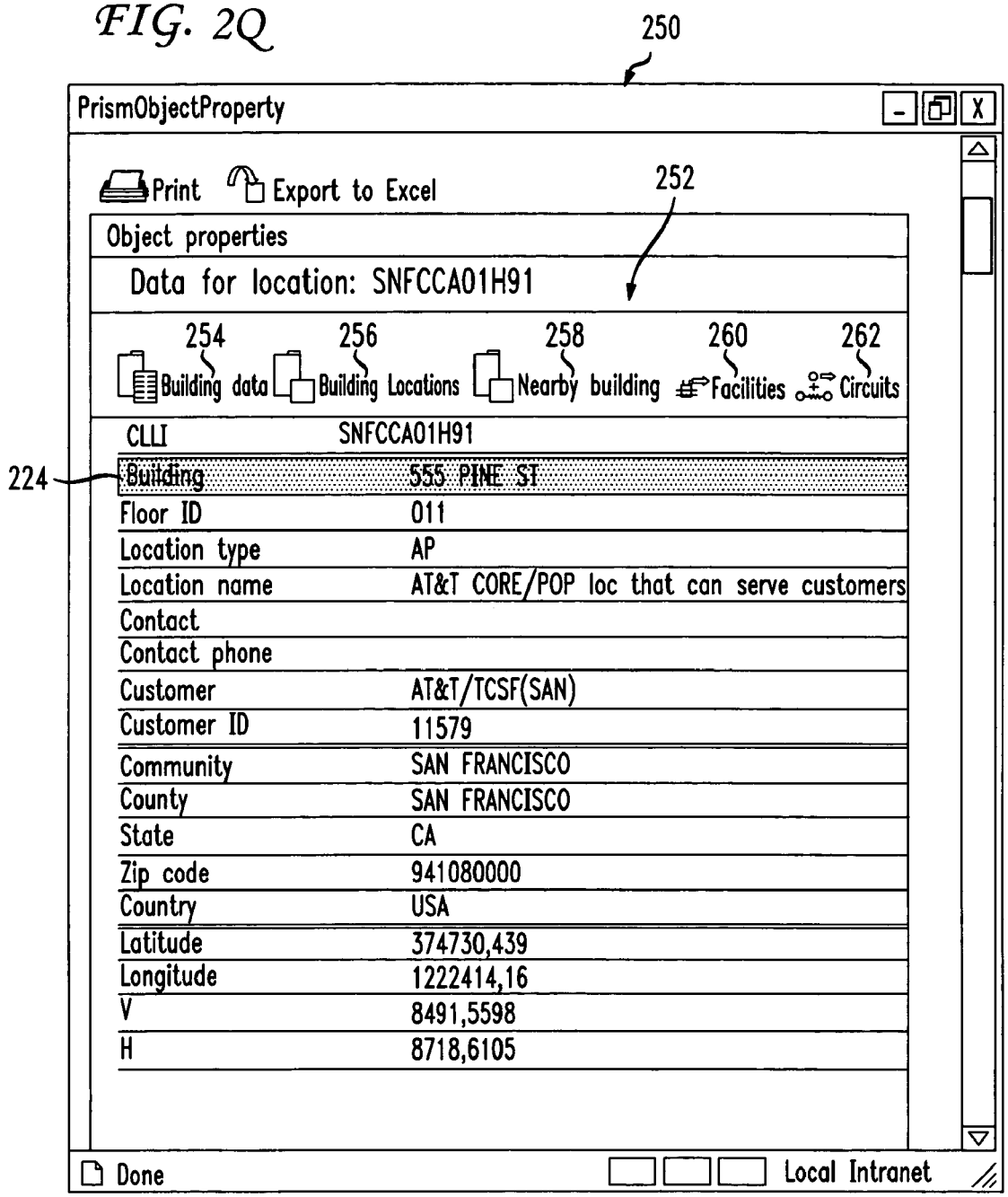

Referring to FIGS. 2L-2S, other GUI screens generated by the application show data displayed for other equipment (besides devices) and entities, including facility, location, building, project and customer. FIG. 2L shows a "Data for building" view 200. FIG. 2M shows a "Data for facility" view 210. FIG. 2N shows a "Data for location" view 220. The "Data for location" view 220 provides such location information as CLLI 222, Building 224 and Floor ID 226. FIG. 2O shows a "Data on customer" view 230. FIG. 2P shows a "Data on project" view 240.

It will be noted that certain fields, such as the Building row (or field) 224 shown in FIG. 2N, are presented on the screens with a certain color, e.g., blue. That color indicates to the user the ability to click on that row/field and a view a toolbar on the top of the screen. The toolbar presents the user with a set of options associated with the entity represented by such a row or field. For example, when a user clicks on the Building row 224 (of FIG. 2N) in the location data (which represents the building where the location is situated), the screen changes to that shown in FIG. 2Q, and indicated by reference numeral 250. It can be seen in FIG. 2Q that the selected row gets highlighted in a different color, e.g., green, and a toolbar that allows access to functions specific for the building, toolbar 252, appears in the screen 250. The functions, which correspond to different toolbar buttons, include: "Building data"

254, which shows data on the building; "Building locations" 256, which shows a list of all locations in the building; "Nearby buildings" 258, which shows a list of all buildings that are found based on certain criterion, e.g., by distance to the original building, or simply a number of closest buildings; "Facilities" 260; which lists all facilities in the building; and lastly, "Circuits" 262, which lists all circuits in the building.

If a user clicks on any of these toolbar buttons, a new window will open displaying information of a desired nature on the selected entity. For example, FIG. 2R illustrates an "All facilities in building" view 270 which is displayed when a user clicks on the "Facilities" button 260 (from FIG. 2Q). This new view provides rows of data 272 corresponding to the different facilities in the building and a set of toolbar options 274 when one of the rows is selected (as indicated by the highlighted row). The toolbar options correspond to toolbar buttons that give access to functions that work with facilities. In yet another example, and referring to FIG. 2S, an "All circuits in building" view 280 is displayed when a user clicks on the "Circuits" button 262 (from FIG. 2Q). The user is provided with rows of data 282 corresponding to the different circuits in the building and a set of toolbar options, toolbar options 284, when one of the rows is selected. The toolbar options correspond to toolbar buttons that give access to functions that work with circuits.

On each of the screens in which at least one row is displayed in color, therefore, a user can click on that row and be presented with a toolbar pertaining to the entity represented in the selected row. On each new screen the user sees new functions that allow the user to further investigate equipment, projects, customers and any other entities of interest for a particular application. The GUI thus gives a user a unique ability to perform "data drilling"—the kind of activity that allows a user to explore all aspects of the data in an easy manner.

Access to the application 18 is controlled through security policy. Each user has a set of permissions that determine whether that user is allowed to perform certain types of actions. For example, some users may not be allowed to edit information in the database. At the same time, other users may have access to the complete functionality of the application.

The exemplary screenshots of FIGS. 2A-2S are those seen by a user who is only allowed to explore the database and is not allowed to edit database information. For users that have permission to make changes, it will be appreciated that the toolbars seen on the top of the reports would contain a button that allows access to edit functionality. For example, the screen 280 would include some type of "Edit" button 286, as indicated in dashed lines.

Figure 3A:
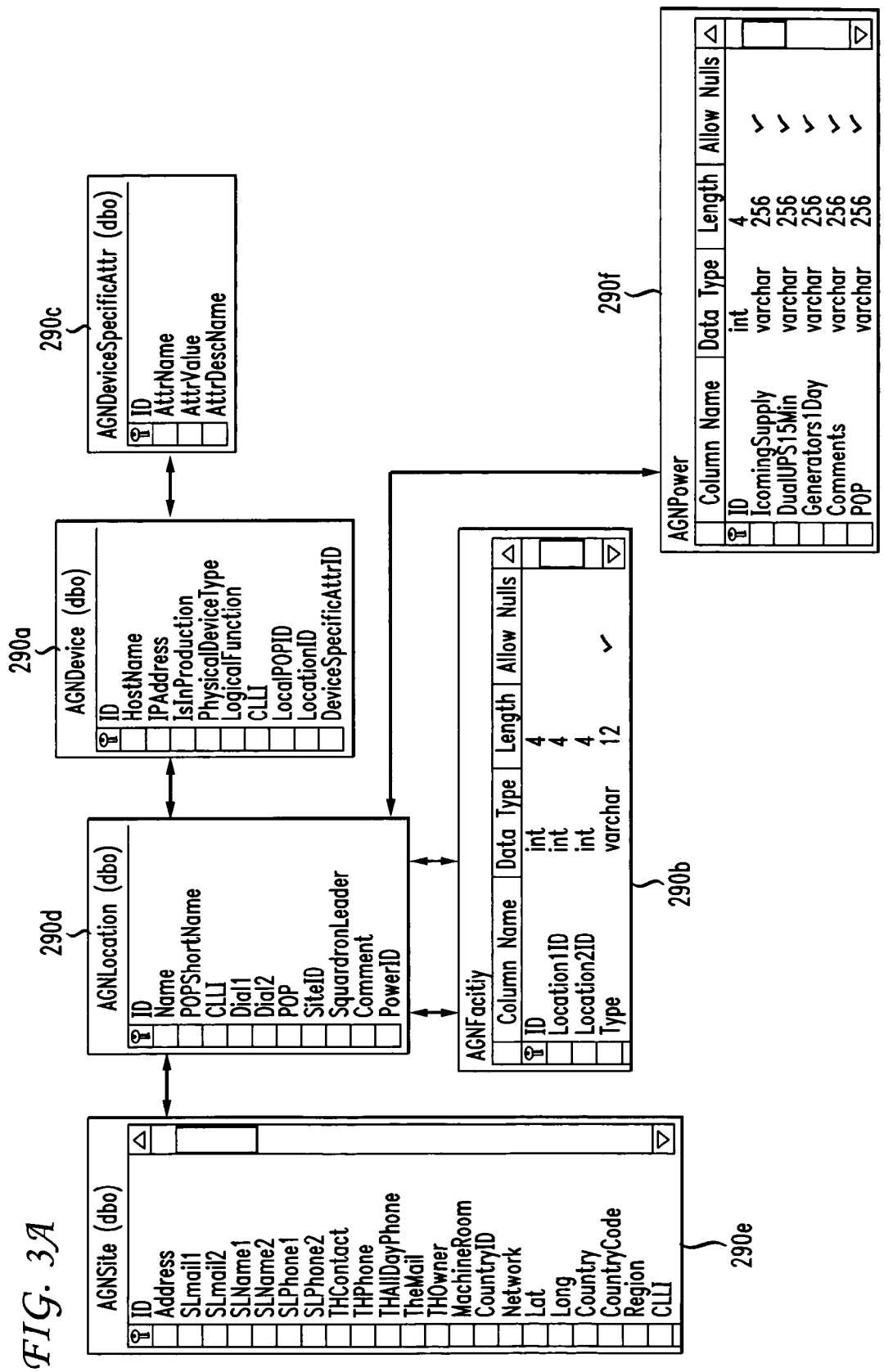
FIGS. 3A-3B show various database data structures used and maintained by the Web-based international facilities planning application.
Figure 3B:
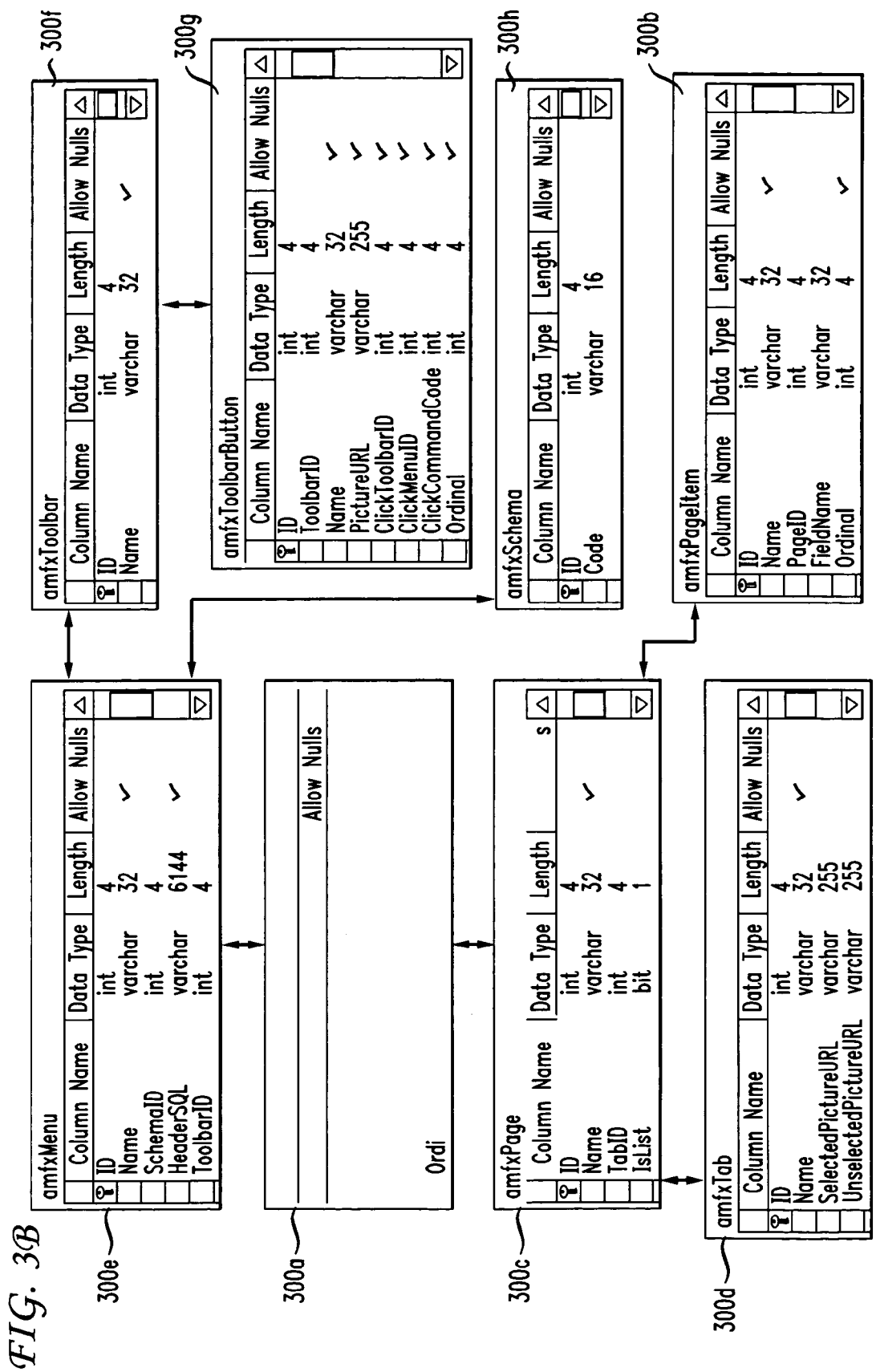

FIGS. 3A-3B show various database data structures used and maintained by the Web-based international facilities planning application 18. FIG. 3A shows a logical schema (or data structure diagram) representing the database network data structures 28 (from FIG. 1) used by the application in the form of a first group of relational tables 290a-290f. FIG. 3B shows a logical schema represented the database GUI data structures 30 (from FIG. 1) used by the application, in the form of second group of relational tables 300a-300h. These tables 300a-300h store details of the GUI, e.g., data which define form layouts and queries use to generate the various reports. The logical database scheme of FIGS. 3A and 3B show the types of information contained in the database and the relationships between different data entities. In one exemplary embodiment, the database is implemented as a SQL Server database.

The illustrated embodiment of FIG. 1 and FIGS. 2A-2S assumes that the database is updated by only manual user input made by authorized users. Although not shown in FIG. 1, the system design can allow the data to be provided to other data consumers that may need this kind of information. This type of communication can be implemented with "data feeds", automated processes that compress and send data to a destination over the network on a scheduled basis. The information sent in the data feeds is provided as "read-only", that is, for reviewing and exploration only. The "data feed" functionality can be implemented in the Web Server software, e.g., using Connect Direct software.

Referring back to FIG. 1, in one exemplary embodiment, the application 18 is implemented using ASO.NET and C# as programming languages. Thus, the application 18 operates in a .Net framework, which in theory makes the application platform independent. To display the geographic view the application 18 makes use of web mapping software, e.g., Autodesk MapGuide® ActiveX control software, that has been downloaded to the client computer's Web browser. The application 18 may be configured to deploy this software to the client computer automatically.

In the illustrated embodiment, most of the GUI-pertaining information in stored in the database. As mentioned earlier, all form layouts and queries that generate the various reports are defined in the database. Such an implementation facilitates the process of changing the GUI to customize the application for a particular user's needs. Only major GUI changes require changes in and recompilation of the application source code.

It should be noted that information presented on the screenshots described herein is in no way intended to represent accurately actual equipment and relationships between different equipment units. The information is intended for illustrative purposes only.

The system 12 thus fulfills a need for an application that would allow managing-data on international equipment, as well as using this data to plan, implement and maintain proprietary facilities riding on international facilities. The system 12 deals with infrastructure of international networks and supports an application which allows data to be displayed in both geographic and tabular form. As access to international equipment data is among the most significant tasks in the network, the use of the system 12 by international facility planning personnel and other users takes the work of such users to a new level of effectiveness.

Since the Internet is most widely available network, implementing such a system as a Web-based architecture is an extremely effective way to provide access to the international infrastructure. With a Web-based application, there is no need to install on the client computers any software other than a browser (as shown in FIG. 1) in order to gain access to the network data. Also, the application 14 provides an easy and convenient way for users to access the application's functions. However, other implementations are contemplated as well.

What is claimed is:

1. A method of managing network infrastructure, comprising:
providing information related to infrastructure of international networks, including facilities and equipment, wherein the equipment comprises international equipment and proprietary equipment; and
enabling display of the information, wherein the information describes a relationship between the international equipment and the proprietary equipment, wherein a portion of the information is provided in one or more selectable display layers over a fixed geographical image, wherein each one of the one or more selectable display layers comprises one or more objects, wherein a position of each one of the one or more objects is determined by a respective geographical coordinate of each one of the one or more objects relative to the fixed geographical image.

2. The method of claim 1 wherein said enabling comprises: enabling display of the information in a geographic form.

3. The method of claim 2 wherein the geographic form of display of the information comprises said one or more display layers, each of the one or more display layers corresponding to a type of object and capable of being selected independently of the other display layers.

4. The method of claim 3 wherein each type of object that is displayed is represented by a symbol and a text label unique to such object.

5. The method of claim 1 wherein said enabling comprises: enabling display of the information in a tabular form.

6. The method of claim 1 wherein the facilities comprise international facilities.

7. The method of claim 1 wherein the one or more objects comprise types of devices and associated device attributes.

8. The method of claim 1 wherein the information comprises data structures usable to provide a graphical user interface.

9. The method of claim 8 wherein the data structures are stored in a database.

10. The method of claim 9 wherein the database comprises a SQL server database.

11. A computer program product residing on a computer-readable medium for managing network infrastructure, the computer program product comprising instructions causing a computer to:

provide information related to infrastructure of international networks, including facilities and equipment, wherein the equipment comprises international equipment and proprietary equipment; and enable display of the information, wherein the information describes a relationship between the international equipment and the proprietary equipment, wherein a portion of the information is provided in one or more selectable display layers over a fixed geographical image, wherein each one of the one or more selectable display layers comprises one or more objects, wherein a position of each one of the one or more objects is determined by a respective geographical coordinate of each one of the one or more objects relative to the fixed geographical image.

12. An apparatus for managing network infrastructure, comprising:

means for providing information related to infrastructure of international networks, including facilities and equipment, wherein the equipment comprises international equipment and proprietary equipment; and means for enabling the information to be displayed to a user, wherein the information describes a relationship between the international equipment and the proprietary equipment, wherein a portion of the information is provided in one or more selectable display layers over a fixed geographical image, wherein each one of the one or more selectable display layers comprises one or more objects, wherein a position of each one of the one or more objects is determined by a respective geographical coordinate of each one of the one or more objects relative to the fixed geographical image.

13. A graphical user interface comprising:

a geographic view comprising a map that shows a representation of an international network infrastructure, including facilities and equipment, in a geographic area of interest, wherein the equipment comprises international equipment and proprietary equipment;

a tree structure usable to select objects associated with the international network infrastructure, to be displayed via one or more display layers on the map over a fixed geographical image of said geographic area of interest, wherein each one of the one or more selectable display layers comprises one or more of the objects, wherein a position of each one of the one or more objects is determined by a respective geographical coordinate of each one of the one or more objects relative to the fixed geographical image; and a toolbar with options usable to select attributes to be displayed for the selected objects.

* * * * *